United States Patent Office 3,472,817
Patented Oct. 14, 1969

3,472,817
NOVEL N,N'-BIISOIMIDES AND POLYMERIC DERIVATIVES THEREOF
Eddie Hedaya, White Plains, Spyros Theodoropulos, Riverdale, and Richard L. Hinman, New York, N.Y., assignors to Union Carbide Corporation, a corporation of New York
No Drawing. Filed July 6, 1965, Ser. No. 469,843
Int. Cl. C08g 20/20
U.S. Cl. 260—78   4 Claims

ABSTRACT OF THE DISCLOSURE

N,N'-biisoimides, such as N,N'-biisosuccinimide, are prepared by the reaction of at least two moles of a cyclic hydration of the intermediate diacid. The N,N'-biisoimides undergo vinyl-type polymerization to form products useful as coatings, films, fibers and the like.

---

This invention relates to a novel class of heterocyclic compositions and various derivatives thereof. In one aspect, this invention is directed to novel N,N'-biisoimides and certain derivatives thereof which are useful in various fields of application. In a further aspect, this invention is directed to novel N,N'-biisomaleimides and polymeric derivatives thereof.

It has now been discovered that a class of useful and heretofore unknown N,N'-biisoimides can conveniently be prepared by the reaction of at least two moles of a cyclic anhydride and one mole of hydrazine followed by dehydration of the intermediate diacid. The resulting N,N'-diisoimides are a novel class of compounds which as hereinafter indicated are useful in a wide variety of application.

Heretofore the synthesis of isomaleimides and biisomaleimides reported in the literature has been directed to those compounds wherein the nitrogen atom is attached to other portions of the molecule through a carbon to nitrogen bond. In the case of the reported biisomaleimides, the two nitrogen atoms are separated by a hydrocarbon group. For example, the work of K. C. Tsou, R. J. Barnett, and A. B. Seligman, J. Am. Chem. Soc., 77, 4613 (1955) reports the preparation of N-(4-hydroxy-1-naphthyl)isomaleimide by the dehydration of N-(4-hydroxy-1-naphthyl) maleamic acid with trifluoroacetic anhydride. More recently, it has been reported by R. J. Cotter, C. K. Sauers and J. M. Whelan, J. Org. Chem., 26, 10 (1961), U.S. Patent 3,041,376 that substituted isomaleimides and biisomaleimides wherein the nitrogen atoms are separated by a hydrocarbon group have been prepared by dehydration of the corresponding N-substituted maleamic acids with N,N'-dicyclohexylcarbodiimide, ethyl chloroformate-triethylamine, and trifluoroacetic anhydride-triethylamine.

Accordingly, one or more of the following objects will be achieved by the practice of the present invention. It is an object of this invention to provide a class of novel N,N'-biisoimides. Another object of this invention is to provide a class of novel N,N'-biisomaleimides. A further object is to provide a class of novel N,N'-biisophthalimides. A still further object of this invention is to provide various novel derivatives of the aforementioned novel N,N'-biisoimides. Another object is to provide certain novel polymeric derivatives of the N,N'-biisomaleimides. A further object is to provide a process for the preparation of the novel compositions of this invention. These and other objects will readily become apparent to those skilled in the art in the light of the teachings herein set forth.

The N,N'-biisoimides of the present invention are reactive materials which condense readily with nucleophiles such as amines, alcohols, and the like to form the corresponding amides, esters, and like compounds. Additionally, the biisoimides can undergo vinyl-type polymerization reactions or condensation-type reactions to form valuable polymeric products. These nitrogen-containing polymeric products have been found particularly useful in the preparation of fibers, films, coatings, elastomers, castings, and high temperature polymers. For example, the reaction of a dihydrazide with N,N'-biisomaleimide gives a polyhydrazide which upon heating converts to novel polyoxadiazoles.

Moreover, the novel N,N'-biisoimides of this invention which contain olefinic unsaturation. e.g., N,N'-biisomaleimide, are also useful as cross-linking agents in systems containing conjugated unsaturation or unsaturation capable of undergoing a Diels-Alder reaction with a dienophile. For example, formulations containing drying oils such as oiticica oil, dehydrated castor oil and the like can be cured by cross-linking with N,N'-biisomaleimide.

In its broad aspect, as hereinbefore indicated, the present invention is directed to novel N,N'-biisoimides, various monomeric and polymeric derivatives thereof, and processes for their preparation. In one embodiment, the present invention is directed to novel N,N'-biisoimides of the formula:

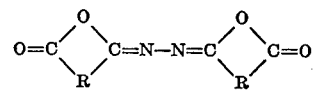

wherein R represents a member selected from the class consisting of divalent hydrocarbon and halohydrocarbon groups of from 2 to 24 carbon atoms, wherein two adjacent carbon atoms of said R groups form a five-membered ring with the carbon atoms to which said R groups are attached.

A preferred class of compositions within this embodiment can also be represented by the formula:

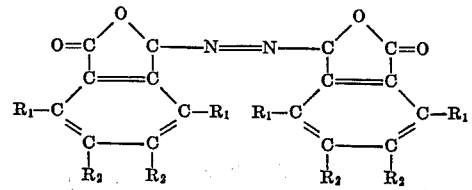

wherein $R_1$ and $R_2$ represent a member selected from the class consisting of hydrogen, halogen and hydrocarbon groups; said $R_1$'s and $R_2$'s on the same ring ring having a total of up to 18 carbon atoms, with the proviso that the two adjacent $R_2$'s when taken together, can form with the carbon atoms to which they are attached, a member selected from the class consisting of arylene, cycloalkylene, and bicycloalkylene groups.

A second preferred class of compositions within this embodiment, include those represented by the formula:

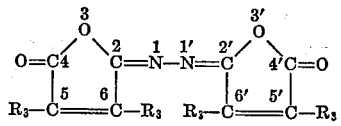

wherein $R_3$ represents a member selected from the class consisting of hydrogen, halogen, and hydrocarbon groups having a total of up to 22 carbon atoms.

Illustrative novel compositions encompassed by the aforementioned classes of this embodiment of the invention include, among others, N,N'-biisophthalimide, the alkyl-substituted N,N'-biisophthalimides, e.g., 5-methyl-N,N'-biisophthalimide, 5,5'-dimethyl-N,N'-biisophthalimide, and the like; the halogenated N,N'-biisophthalimides, e.g., 5-dichloro - N,N' - isophthalimide, 5,5', 6,6'- tetrachloro-N,N'-biisophthalimide, 5-bromo-N,N'-isophthalimide, 5,5'-dibromo-N,N'-biisophthalimide, and the like; N,N'-biisomaleimide, the alkyl-substituted N,N'-biisomaleimides, e.g., 5-methyl-N,N'-biisomaleimide, 5,5'-dimethyl-N,N'-biisomaleimide, and the like.

In another preferred aspect of this embodiment, the present invention is directed to novel Diels-Alder adducts of N,N'-biisomaleimide and various dienes. These novel compositions can be represented by the formula:

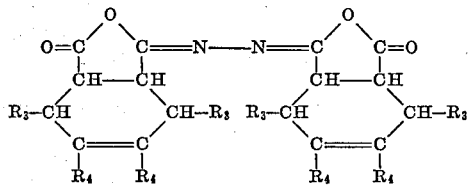

wherein $R_3$ and $R_4$ represent members selected from the class consisting of hydrogen, halogen and hydrocarbon groups having a total of up to 18 carbon atoms, with the proviso that (a) two $R_3$'s on the same ring when taken together can form an alkylene group of up to 6 carbon atoms, and (b) adjacent $R_3$'s and $R_4$'s when taken together can form with the carbon atoms to which they are attached, a member selected from the class consisting of cycloalkylene and bicycloalkylene groups.

Illustrative novel Diels-Alder adducts of biisomaleimide and dienes can be represented by the formulae:

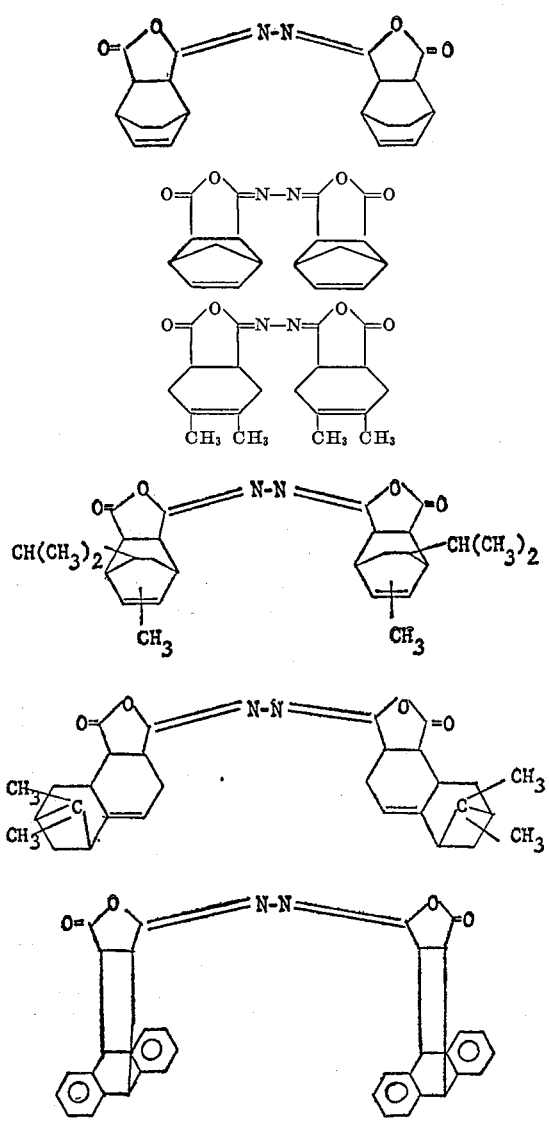

The novel compositions of this embodiment of the invention can be prepared by one or more routes. As hereinbefore indicated, the novel compositions of the first two classes can be conveniently prepared by the reaction of at least two moles of a cyclic anhydride with one mole of hydrazine followed by dehydration of the intermediate diacid. Illustrative of this reaction is the following wherein R has the same value as previously indicated:

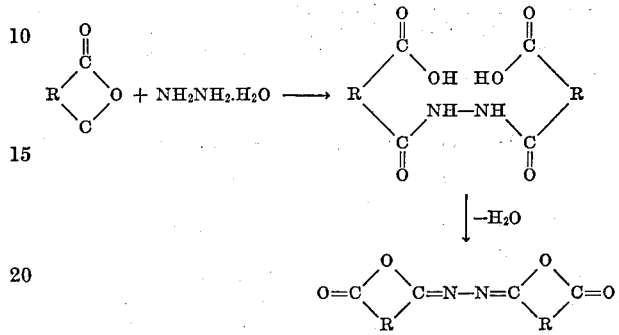

The reaction of the cyclic anhydride with hydrazine to form the intermediate diacid is effected in glacial acetic acid or an acetic acid-alcohol mixture at temperatures preferably not in excess of about 25° C. i.e., from about −10° C. to 25° C. In practice, a cold solution of hydrazine hydrate is prepared by slowly adding hydrazine hydrate to cold glacial acetic acid. Thereafter, this solution is added to a solution of the anhydride in glacial acetic acid while maintaining the temperature below 25° C. After allowing the mixture to stand at about 25° C. for a few hours, the precipitated intermediate acid is recovered, purified by conventional techniques, and dehydrated to the biisoimide.

Dehydration can be effected by refluxing the intermediate diacid with a suitable dehydrating agent. Although a variety of dehydrating agents can be employed, trifluoroacetic anhydride, acetic anhydride, acetyl chloride, thionyl chloride, dicyclohexylcarbodiimide, are preferred.

In some instances, it may be desirable to conduct the dehydration step in a suitable inert organic solvent. A wide variety of solvents can be employed, the only requirement being that they do not act adversely with the starting materials or reaction products and are easily separated from the biisoimide. Illustrative solvents include, among others, the aromatic hydrocarbons, such as benzene, xylene, and the like.

As previously indicated, the novel biisoimides of this invention are prepared by the reaction of at least two moles of the anhydride per mole of hydrazine, followed by dehydration of the diacid intermediate. A mole ratio of anhydride to hydrazine within the range of from about 2:1 to about 3:1 is preferred.

As hereinafter indicated, the starting materials for the preparation of the novel compositions of the first two classes of this embodiment are hydrazine and cyclic anhydrides of the formula:

wherein R has the same value as previously indicated. Illustrative cyclic anhydrides which can be employed include, among others, phthalic anhydride; the alkyl-substituted phthalic anhydrides, e.g., 4-methylphthalic anhydride, 4,5-dimethylhthalic anhydride and the like; the halo-substituted phthalic anhydrides, e.g., 4-chlorophthalic anhydride, 4,5-dichlorophthalic anhydride and the like; maleic anhydride; the alkyl-substituted maleic anhydrides, e.g., 4-methylmaleic anhydride, 4,5-dimethylmaleic anhydride, and the like; the halo-substituted maleic anhydrides, e.g., 4-chloromaleic anhydride, 5-bromomaleic anhydride, and the like.

The Diels-Alder adducts of this embodiment are conveniently prepared by the reaction of the N,N'-biisoimides of the second class with an appropriate diene in accordance with known techniques. A wide variety of dienes can be employed and include those represented by the formula:

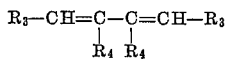

wherein $R_3$ and $R_4$ have the same values as previously indicated.

Illustrative dienes include, among others, 1,3-butadiene, 2-methyl-1,3-butadiene, 2,3-dimethyl-1,3-butadiene, 1,3-pentadiene, 2-methyl-1,3-pentadiene, 2,4-hexadiene, 2,3-dimethyl - 2,4 - hexadiene, 1,3- hexadiene, 1,3-octadiene, 3,5-octadiene, 2-methyl-3,4-octadiene, 1,3-nonadiene, 4,6-nonadiene, 5,6-dimethyl-4,6-nonadiene, 1,3-decadiene, 3,5-decadiene, 1,3-tetradecadiene, 3,5-tetradecadience, 1,3-nonadecadiene, 10,12-tetracosadiene, cyclopentadiene, methylcyclopentadiene, propylcyclopentadiene, cyclohexadiene, anthracene, phellandrene, nopadiene, and the like.

In practice, the preparation of the novel Diels-Alder adducts of this embodiment can be effected by the reaction of the appropriate 1,3-diene and the N,N'-biisomaleimide at a temperature of from about 50° C. to about 250° C., and more preferably from about 75° C. to about 200° C. for a period of time sufficient to form the composition.

While the reaction temperatures within the aforementioned range of from about 50° C. to about 250° C. have been found desirable, temperatures above and below this range can also be employed. However, for economic consideration the optimum yield and rate of reaction are attained with the aforesaid range. The particular temperature employed will be dependent, in part, upon the diene and dienophillic starting material.

The mole ratio of diene to olefinically unsaturated N,N-biisoimide can vary over a considerable range. For example, a mole ratio of diene to dienophile of from about 0.1:1.0 to about 10:1.0 and more, preferably from about 1.0 to 4.0:1.0 can be employed. Depending upon the choice of reactants and temperatures employed, the reaction period may vary from as little as about one hour, or less, to about 100 hours, or longer,. The pressure employed in the instant process is not necessarily critical and the reaction can be effected at atmospheric, subatmospheric, or superatmospheric pressures.

In some instances, it may be desirable to conduct the reaction in the presence of an inert, normally liquid organic solvent, although the use of a solvent is not required. Suitable solvents include, among others, aromatic hydrocarbons, such as toluene, xylene, benzene, naphthalene, diphenyl, amylbenzene; cycloaliphatic hydrocarbons, such as cyclohexane, heptylcyclopentane; the chlorinated aromatic hydrocarbons, such as chlorobenzene, ortho-dichlorobenzene, and the like.

Recovery of the reaction product can be effected by one of many common techniques such as filtration, distillation, extraction, vacuum sublimation, and the like.

In another embodiment, this invention is directed to various derivatives obtained by the reaction of N,N'-biisoimides and monofunctional nucleophilic compounds containing but one group which is reactive with the N,N'-biisoimides. These novel compositions can be represented by the formula:

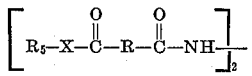

wherein R represents a member selected from the class consisting of divalent hydrocarbon and halohydrocarbon groups of from 2 to 24 carbon atoms, wherein two adjacent carbon atoms of said R groups are attached to the carbonyl groups; $R_5$ represents a member selected from the class consisting of aliphatic, cycloaliphatic, aromatic, and heterocyclic groups of from 1 to 24 carbon atoms; and X represents a member selected from the class consisting of —NH—, —NHNH—, —S—, and —O— groups.

Preferred novel compositions within this embodiment include those prepared from the N,N'-biisophthalimides of the first embodiment of this invention. These novel derivatives can be represented by the formula:

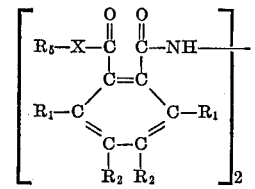

wherein $R_1$, $R_2$, $R_5$ and X have the same value as previously indicated.

Particularly preferred compositions within this embodiment are the derivatives of the N,N'-biisomaleimides which can be represented by the formula:

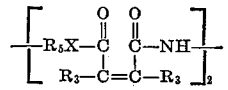

wherein $R_3$, $R_5$ and X have the same value as previously indicated.

Preferred novel compositions within this embodiment of the invention include those wherein $R_5$ represents a group composed of carbon, hydrogen, and in some instances oxygen or nitrogen. Also preferred are those compositions wherein $R_5$ contains from 1 to 24 carbon atoms and represents alkyl aryl, hydroxyalkyl, hydroxyaryl, carboxyalkyl, carboxyaryl, carboxyalkaryl, carboxyarylalkyl, alkoxy, aryloxy, alkylcarbonyl, arylcarbonyl, carboalkoxyalkyl, carboalkoxyaryl, and the like.

Illustrative compounds within this embodiment of the invention include, among others:

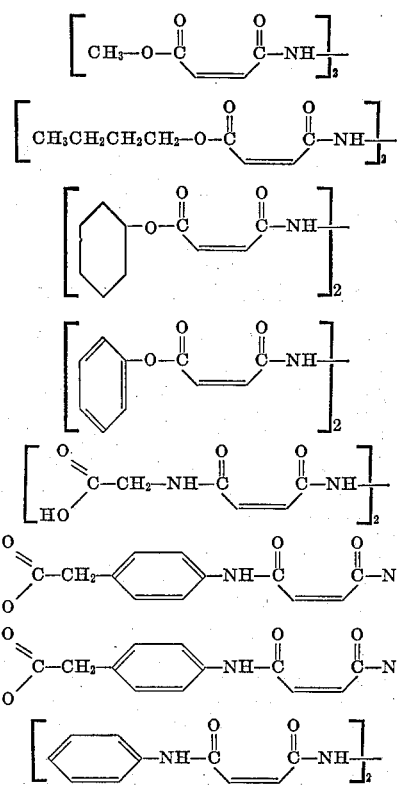

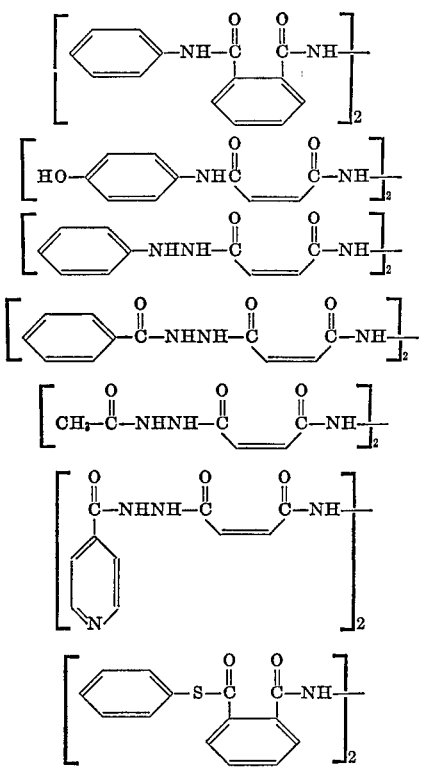

In general, the compositions of this embodiment of the invention are obtained by the reaction of the monofunctional nucleophilic compound with the N,N'-biisoimide in a respective mole ratio of at least about 2:1 at a temperature of from about 10° C. to about 200° C. and more preferably from about 25° C. to about 125° C. Temperatures above and below the aforesaid ranges can also be employed but are less preferred. In many instances, the reaction is conveniently effected at room temperature. In the event that it is desirable to conduct the reaction in a solvent, a variety of inert organic solvents can be employed. For example, suitable solvents include acetic acid, and the like. However, in many instances, for example, adducts of alcohols, the nucleophilic compound can itself serve as the solvent. Separation of recovery of the reaction product can be effected by a variety of known methods.

As previously indicated, the starting materials for this embodiment are the N,N'-biisoimides and monofunctional nucleophilic compounds. These compounds can be represented by the formula:

$$R_5XH$$

wherein $R_5$ and X have the same value as previously indicated.

Illustrative compounds include, among others, monofunctional alcohols, such as methanol, ethanol, propanol, butanol, cyclohexanol, phenol, and the like; the monofunctional amines, such as aniline, p-aminophenol, glycine, ethyl p-aminophenylacetate, p-aminophenylacetic acid, cyclohexylamine, and the like; the hydrazine, such as phenyl hydrazine, benzoyl hydrazine, isonicotinoyl hydrazine, and the like; thiols, such as methyl thiol, phenyl thiol, and the like.

A further embodiment of this invention relates to novel polymeric products formed by the reaction of the aforementioned N,N'-biisoimides with polynucleophilic compounds in condensation-type polymerization reactions. The properties of the polymers, as initially prepared, can be varied over a wide range depending upon the kind of monomeric reagents employed. For example, the polymers prepared from dinucleophilic compounds containing relatively long chains between the functional groups, can provide thermoplastic liner polymers which can be molded at elevated temperatures, or milled at moderately elevated temperatures to give useful and novel polymeric products. In addition, by virtue of the diacyl hydrazine group, i.e.,

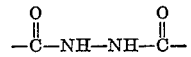

the polymers of this invention are of particular interest as sources of polyoxadiazoles. For example, on controlled heating in an inert atmosphere at temperatures of from about 180° C. to about 300° C., the aforesaid group is transformed to the 1,3,4-oxadiazole group, i.e.,

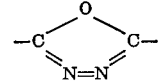

which imparts to polymeric products containing this group remarkable thermal stability.

The novel polymers which can be prepared in accordance with the teachings of this invention are those characterized by the following recurring units:

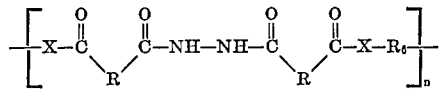

wherein R and X have the same values as previously indicated; $R_6$ represents a member selected from the class consisting of divalent aliphatic, cycloaliphatic, aromatic, and heterocyclic groups of from 1 to 24 carbon atoms; and $n$ has a value, such that the molecular weight of said polymeric product is at least about 500, and more preferably from about 500 to about 30,000.

Preferred polymeric compositions are those having the recurring unit:

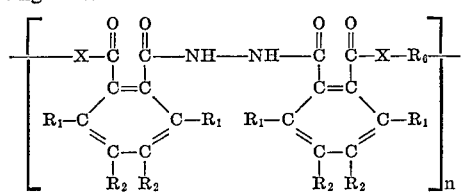

wherein $R_1$, $R_2$, $R_6$, X and $n$ have the same values as previously indicated.

Particularly preferred polymeric compositions are those having the recurring unit:

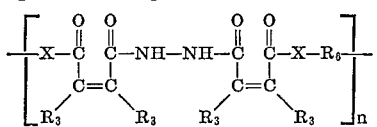

wherein $R_3$, $R_6$, X and $n$ are as previously indicated, and $R_6$ represents alkylene, arylene, or carbonylalkylcarbonyl groups.

Each of the aforementioned polymeric products is conveniently prepared by a condensation of the N,N'-biisoimide with a polyfunctional nucleophilic compound of the formula:

$$HXR_6XH$$

wherein $R_6$ and H have the same value as previously indicated. Suitable compounds include the polyhydric alcohols, such as ethylene glycol, diethylene glycol, triethylene glycol, 1.5-pentadiol, hexylene glycol, 2-methyl-2 - ethyl - 1,3 - propanediol, 2-ethyl-1,3-hexanediol, 1,2,6-hexanetriol, polypropylene glycol (molecular weight 400–2100), and the like; the polythiols, e.g., pentanedithiol, hexanedithiol, and the like; the polyhydrazides, e.g., oxalyl dihydrazide, succinoyl dihydrazide, and like; the polyamines such as 1,2-diaminoethane, 1,3-diaminopropane, 1,4-diaminobutane, 1,5-diaminopentane, 1,6-diaminohexane, 1,8-diaminooctane, 1,9-diaminoonane, 1,10-diaminodecane, 1,4-diaminocyclohexane, 1,4-phenylene diamine, 1,3-phenylene diamine, 1,2-phenylene diamine, 4,4' - diaminodiphenyl methane, 4,4' - diaminodiphenyl, 3,3'-diamino-4,4'-dimethyldiphenyl, 3,3'-diamino, 4,4'-dimethoxydiphenyl, N,N'-dimethylhexamethylene diamine, N,N'-dimethyl-(2-phenoxy)-trimethylene diamine, N,N'-dimethyldecamethylene diamine, N,N'-dimethyl-2-phenyl-decamethylene diamine, N,N'-dimethyl-3,3'-diaminophenyl, N - methyl - N' - ethyl - hexamethylene diamine, N-ethyl - N' - n-propyl-1,4-phenylene diamine, N-phenyl-N'-(3-chloropropyl)-1,4-phenylene diamine, N-ethyl-N'-(2-phenyl-n-decyl)-butane-1,4-diamine, and the like.

Also suitable are heterocyclic diamines having the general formula:

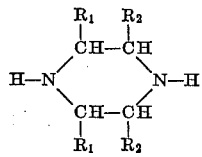

wherein $R_1$ and $R_2$ are monovalent hydrocarbon radicals or hydrogen. Suitable monovalent hydrocarbon radicals include, among others, the alkyl radicals, such as methyl, ethyl, n-propyl, n-butyl, isobutyl, and the like; cycloalkyl radicals such as cyclohexyl and the like; alkyl radicals having cycloalkyl substituents, such as cyclohexylmethyl and the like; aromatic hydrocarbon radicals, such as phenyl and the like. Specific suitable heterocyclics are 2-methyl-piperazine, 2,5 - dimethyl - piperazine, 2-phenyl-piperazine and the like. Particularly desirable piperazines are those wherein $R_1$, $R_2$, $R_3$, and $R_4$ which can be the same or different are hydrogen or monovalent hydrocarbon radicals having a maximum of six carbon atoms and being free of intereference groups. Mixtures dinucleophilic compounds having the same reactivity can be used if desired.

Various amounts of the polynucleophilic compound of the N,N'-biisoimide, e.g., N,N'-biisomaleimide, can be reacted. Generally using from about 0.9 to about 1.1 moles of the organic diamine per mole of the N,N'-biisoimaleimide is satisfactory. Reacting a mixture containing more than about 1.1 moles of the nucleophilic compound per mole of the N,N'biisomaleimide does not materially increase the yield of polymer produced and is economically undesirable. Optimum results are achieved using equimolar amounts of the two reactants.

The temperature at which the reaction between the N,N'-biisomaleimide and the nucleophile is conducted can also vary over a wide range, from as low as about —5° C. to about 250° C. A temperature in the range of about 0° C. to about 50° C. is most preferred.

Although not necessary, it is preferred to conduct the reaction in the presence of an organic diluent which is a solvent for the starting materials and is non-reactive with respect to the starting materials and the final product. The use of an organic diluent facilities removal of the polymer from the reaction mixture. The actual organic diluent used will depend upon the starting materials and the temperature at which the polymerization reaction is to be conducted. The organic diluent should have a boiling point equal to or above the reaction temperature. It is customary to use the organic diluent in amounts of at least about 50 percent by weight based on the weight of the starting materials. The upper limit with respect to the amount of organic diluent used will depend upon the rate at which it is desired to conduct the polymerization reaction. the more diluent the reaction mixture, the slower the rate of reaction. From a practical standpoint, the organic diluent is used in amounts up to 500 percent by weight based on the weight of the starting materials.

Suitable organic diluents include, among others, the aromatic hydrocarbons, such as benzene, xylene, and the like; the halogenated aromatic hydrocarbons, such as chlorobenzene and the like; cycloaliphatic hydrocarbons, such as cyclohexane, n-propyl cyclohexane, and the like; alkoxy substituted aromatic hydrocarbons such as methoxybenzene and the like; halogenated aliphatic hydrocarbons, such as dichloromethane and the like; ethers, such as diethyl ether, diethyl ether of ethylene glycol, diethyl ether of 1,3-propylene glycol, dioxane and the like; aliphatic ketones, such as acetone, methyl ethyl ketone, and the like. Preferred solvents are dimethyl formamide, dimethylsulfoxide, hexamethylphosphoramide, and the like.

The reaction between the N,N'-biisomaleimide and the nucleophilic is conducted, generally, under atmospheric pressure, although, if desired, the reaction can be conducted under subatmospheric or superatmospheric pressure.

The process of the present invention is conducted by simply admixing the N,N-biisomaleimide and the nucleophilic compound at the desired temperature. The reaction between the N,N'-biisomaleimide and the organic diamine to produce the thermoplastic, linear polymers of this invention is practically instantaneous in that some polymer is formed immediately upon admixing the reactants. It is customary, however, to allow the reaction mixture to stand for at least about one hour in order to insure that the polymerization reaction has proceeded to completion.

Recovery of the thermoplastic, linear polymer from the reaction mixture can be accomplished by any one of a number of convenient methods. For example, the polymer is usually recovered as a filter cake by filtering the reaction mixture. If the polymer is in solution, the solution can be poured into a liquid which is a non-solvent for the polymer and a solvent for the liquid of the polymer solution with the result that the polymer will precipitate out. Recovery of the polymer can then be effected by simple filtration.

As previously indicated, the polymeric products obtained by this invention have molecular weights up to about 30,000 as determined by reduced viscosity measurements in dimethylsulfoxide or m-cresol.

The linear polymers of this invention can be extruded into various shaped articles, such as lamp bases, toys, and the like; cast into film material which can be used in the manufacture of bags, wrapping material, and the like; or formed into fibers which can be used in the manufacture of articles of clothing.

The following examples are illustrative:

EXAMPLE 1

Preparation of N,N'-biisomaleimide (a) Preparation of 1,2-bis(3-carboxyacryloyl)-hydrazine.—A cold solution of hydrazine hydrate, prepared by slowly adding 5.00 grams (0.1 mole) of 99–100 percent hydrazine hydrate to 25 milliliters of cold glacial acetic acid, was added to a solution of 19.6 grams (0.2 mole) of maleic anhydride in 100 milliliters of glacial acetic acid. The temperature was maintained below 25° C. throughout the addition and then the mixture allowed to stand at 25° C. for 3 hours. The crude hydrazide was filtered off and washed thoroughly with ethanol. The yellow solid was then dried in vacuo for 3 hours to give 19.9 grams (85 percent) of yellow solid, having a melting point of 183–184° C.

(b) Cyclization of 1,2-bis(3-carboxyacryloyl)-hydrazine in trifluoroacetic anhydride.—1,2 - bis(3 - carboxy-acryloyl)-hydrazine (2 grams, 0.0087 mole) was refluxed for 5 hours in trifluoroacetic anhydride. The mixture was cooled and 1.5 grams of a yellow solid was filtered off. Recrystallization in dimethyl formamide gave 1.0 gram (yield 60 percent) of pure N,N'-biisomaleimide. The melting point and infrared analysis were consistent with the assigned structure.

(c) Cyclization of 1,2-bis(3 - carboxyacryloyl)-hydrazine in acetic anhydride.—1,2-bis(3-carboxyacryloyl)-hydrazine (3 grams, 0.013 mole) was refluxed in a mixture of 25 milliliters of benzene and 10 milliliters of acetic anhydride for 8 hours. At the end of this period, a yellow solid was isolated by filtration from the reaction mixture and washed with ether. The yield was 9 grams (36 percent) having a melting point of 260° C. This was identical on the basis of melting point and infrared to N,N'-biisomaleimide prepared by the previous method. Upon analysis the product had the following composition:

Calculated for $C_4H_2NO_2$: C, 50.00; H, 2.04; N, 14.58. Found: C, 50.14; H, 2.32; N, 14.39.

The structural assignment was based on the presence of bands in the infrared at 5.6 and 6.1$\mu$ and an ultraviolet spectra with $$\lambda_{max.}^{CH_3CN} = 292 \text{ m}\mu \ \epsilon = 1.8 \times 10^4$$

(d) Cyclization of 1,2-bis(3-carboxyacryloyl)-hydrazine in acetyl chloride.—1,2-bis(3-carboxyacryloyl)-hydrazine (200 grams, 0.877 mole) was refluxed in 500 grams of acetyl chloride overnight. The yellow solid was filtered off and washed with ether. After two recrystallizations from dimethylformamide, there was obtained 70 grams (42 percent) of pure N,N'- biisomaleimide having a melting point of 260° C.

EXAMPLE 2

Preparation of N,N'-biisophthalimide (a) Preparation of 1,2-bis(2-carboxybenzoyl)-hydrazine.—Ninety-nine percent hydrazine hydrate (2.5 grams, 0.05 mole) in 10 milliliters of methanol was added to a solution of 14.8 grams (0.1 mole) of phthalic anhydride in 75 milliliters of acetic acid and 50 milliliters of methanol at —5° C. After stirring at this temperature for one hour ether was added and the white solid filtered off. After washing with ether, there was obtained 16.4 grams of 1,2 - bis(2 - carboxybenzoyl)-hydrazine which represented a yield of 100 percent. The product had a melting point of 245° C. and the infrared spectra was consistent with the assigned structure. Upon analysis the product was found to have the following analysis.

Calculated for $C_8H_6NO_3$: C, 58.53; H, 3.68; N, 8.53. Found: C, 58.56; H, 3.78; N, 8.32.

(b) Preparation of N,N'-biisophthalimide.—1,2-bis(2-carboxybenzoyl)-hydrazine (2 grams, 0.006 mole) was refluxed in 25 milliliters of trifluoroacetic anhydride overnight. The mixture was cooled and the trifluoroacetic anhydride distilled off in vacuo. After washing in methanol and recrystallization from dimethylformamide 1.5 grams (86 yield percent) of pale yellow material was obtained having a melting point of 260° C. This compound dissolved readily in 15 percent sodium hydroxide but was insoluble in water and had the characteristic isoimide bands at 5.6 and 6.1$\mu$ in the infrared and upon analysis the product had the following composition:

Calculated for $C_8H_4NO_2$: C, 65.75; H, 2.80; N, 9.60. Found: C, 65.62; H, 2.79; N, 9.40.

EXAMPLE 3

Diels-Alder adduct of N,N'-biisomaleimide and 2,3-dimethylbutadiene

N,N'-biisomaleimide (.96 gram, 0.005 mole) and a 50 percent excess of 2,3-dimethylbutadiene were refluxed with stirring in 20 milliliters of nitromethane for 3 hours. The solvent was removed in vacuo and the residue recrystallized from benzene to give the crystalline adduct having a melting point of 202° C. and in a yield of 0.80 gram.

N,N'-biisomaleimide (.96 gram, 0.005 mole) and a 50 percent excess of 2,3-dimethylbutadiene were refluxed for 3 days with stirring in 20 milliliters of benzene. Removal of solvent and recrystallization from dioxane gave 0.80 gram (47 percent) of the adduct having a melting point of 202° C. The adduct had characteristic infrared bands at 5.5, 5.6, and 6.0$\mu$;

$$\lambda_{max.}^{dioxane} = 278 \text{ m}\mu, \ \epsilon = 1.7 \times 10^4$$

Upon analysis the product had the following composition:
Calculated for $C_{10}H_{12}NO_2$: C, 67.48; H, 6.52; N, 7.92. Found: C, 67.39; H, 6.78; N, 7.86.

EXAMPLE 4

Diels-Alder adduct of N,N'-biisomaleimide and cyclopentadiene

A mixture of 2 grams (0.0104 mole) of N,N'-biisomaleimide and 3 grams (0.045 mole) of freshly distilled cyclopentadiene in 20 milliliters of dry benzene was refluxed until the yellow color disappears (2 hours). The solution was cooled and ether was added to completely precipitate the solid product. This was washed with ether and recrystallized from dioxane to give a white crystalline solid having a melting point of 225–227° C. (yield 75 percent).

The product had characteristic bands in the infrared at 5.6 and 6.1$\mu$;

$$\lambda_{max.}^{dioxane} = 224 \text{ m}\mu, \ \epsilon = 1.33 \times 10^4$$

The nuclear magnetic resonance spectrum in $CDCL_3$ with tetramethylsilane as an internal standard consisted of broad resonances at 6.3, 3.5, and 1.7 parts per million in an area ratio of 2:2:2, respectively. The product was also readily soluble in 15 percent sodium hydroxide, but insoluble in water. Upon analysis the product had the following composition:

Calculated for $C_9H_8NO_2$: C, 66.65; H, 4.97; N, 8.32. Found: C, 66.49; H, 5.20; N, 8.32. This data was consistent with the structure:

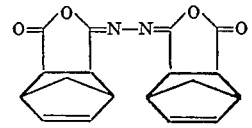

EXAMPLE 5

Diels-Alder adduct of N,N'-biisomaleimide and cyclohexadiene

N,N'-biisomaleimide (.96 gram, 0.005 mole) and 1,3-cyclohexadiene (1.5 grams) was refluxed with stirring in 20 milliliters of nitromethane for 2.5 hours. The solvent was removed in vacuo and the residue was recrystallized from dioxane to give 1.01 grams (57 percent) of the adduct having a melting point of 270–275° C. A second recrystallization from dioxane gave material with a melting point of 278–280° C.

The product had characteristic bands in the infrared at 5.5 and 5.9$\mu$;

$$\lambda_{max.}^{dioxane} = 222 \text{ m}\mu, \ \epsilon = 1.68 \times 10^4$$

nuclear magnetic resonance spectrum $(CDCL_3(CH_3)_3Si)$ showed 3 broad absorptions at 1.6, 3.4, 6.5, in an approximate area ratio of 2:2:1. Upon analysis the product had the following composition:

Calculated for $C_{10}H_{10}NO_2$: C, 68.42; H, 6.01; N, 7.92. Found: C, 68.16; H, 5.72; N, 7.95.

EXAMPLE 6

Diels-Alder adduct of N,N'-biisomaleimide and phellandrene

N,N'-biisomaleimide (.96 gram, 0.005 mole) and 1.5 grams phellandrene (p-methan-1,5-diene) were refluxed with stirring in 15 milliliters of nitromethane for one hour. The reaction mixture was cooled and the unreacted N,N'-biisomaleimide filtered off. The solvent was removed in vacuo and the gummy residue was washed with hexane. The adduct was obtained as an oil after drying in vacuo. The material had characteristic infrared bands at 5.5$\mu$ and 6.0$\mu$ and was soluble in acetone, methanol, benzene, ether, dioxane.

EXAMPLE 7

Diels-Alder adduct of N,N'-biisomaleimide and nopadiene

N,N'-biisomaleimide (.96 gram, 0.005 mole) and nopadiene (2.0 grams) were refluxed with stirring with dioxane for 72 hours. The solvent was removed in vacuo and the residue washed with ligroin. The heavy oily product had characteristic infrared bands at 5.5µ and 6.0µ and was soluble in dioxane, acetone, tetrahydrofuran, and methanol.

EXAMPLE 8

Diels-Alder adduct of N,N'-biisomaleimide and anthracene

N,N'-biisomaleimide (1 gram, 0.0052 mole) and 2.0 grams (0.011 mole) of anthracene was refluxed in 20 milliliters of dioxane containing 1 milliliter trifluoroacetic acid for 70 hours. A white-grey compound was filtered off after cooling. This was washed with dimethylformamide and then ether to give material with a melting point of 335–337° C.

The infrared spectra had bands at 5.6 and 6.1 characteristics of the isoimide ring. The ultraviolet spectra had $$\lambda_{max}^{dioxane} = 225, \epsilon = 2.95 \times 10^4$$

Upon analysis the product had the following composition:
Calculated for $C_{18}H_2NO_2$: C, 78.81; H, 4.41; N, 5.1. Found: C, 78.67; H, 4.83; N, 5.27.
This data is consistent with the structure:

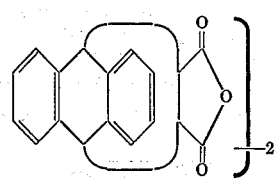

EXAMPLE 9

Reaction product of N,N'-biisomaleimide and aniline

N,N'-biisomaleimide (1.0 gram, 0.005 mole) was combined with 1.0 gram aniline (0.011 mole) in 30 milliliters acetic acid and stirred overnight at room temperature. Ether (50 ml.) was added and the filtered precipitate was washed with additional ether to give 1.93 grams of product having a melting point of 205° C. This represented approximately 100 per cent of the theoretical yield. The same reaction occurs in dimethylsulfoxide solvent.

The product had characteristic broad bands in the infrared spectrum at approximately 3.0µ(NH) and 6.0µ (CO) and absorption in the NMR at 6.5 p.p.m. (vinyl) and between 7.0 and 8.0 p.p.m. (aromatic) in an approximate ratio 2:5 (in deutero-dimethylsulfoxide relative to TMS). Upon analysis the product had the following composition:
Calculated for $C_{14}H_{11}N_2O_2$: C, 63.48; H, 4.97; N, 14.80. Found: C, 63.32; H, 5.18; N, 14.58.
The data was consistent with the structure:

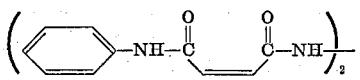

EXAMPLE 10

Reaction product of N,N'-biisomaleimide and p-aminophenol

In a manner similar to that employed in the previous example, biisomaleimide was combined with p-aminophenol. The precipitated product was filtered and washed with ethanol and then ether to give the product in essentially quantitative yield. The melting point was 200° C. The product was recrystallized in dimethylformamide-water to give material with a melting point of 204° C. The product dissolved in 10 percent sodium hydroxide but was insoluble in 10 percent hydrochloric acid. The infrared spectrum had characteristic broad absorptions at 2.8–3.2µ and 6.0–6.3µ. Upon analysis the product had the following composition:
Calculated for $C_{16}H_9N_2O_3$: C, 58.53; H, 4.42; N, 13.65. Found: C, 58.30; H, 4.58; N, 15.41.

The data was consistent with the structure:

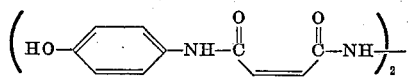

EXAMPLE 11

Reaction product of N,N'-biisomaleimide and glycine

Glycine (0.8 gram, 0.011 mole) was refluxed in 50 milliliters glacial acetic acid until solution occurs. N,N'-biisomaleimide (1.0 gram, 0.005 mole) was added and immediately goes into solution before precipitation of a yellowish solid occurs. The reaction mixture was stirred overnight and filtered. The precipitate was washed with ether and recrystallized from water to give 1.5 grams of product having a melting point of 171–173° C. This represented 88 percent of the theoretical yield. The product had very broad characteristic infrared bands at 3.0–4.8µ and approximately 6.3µ. Upon analysis the product had the following composition:
Calculated for $C_6H_7N_2O_4$: C, 42.10; H, 4.11; N, 16.36. Found: C, 42.06; H, 4.17; N, 16.03.
The data was consistent with the structure:

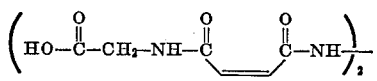

EXAMPLE 12

Reaction product of N,N'-biisomaleimide and ethyl-p-aminophenyl acetate

In a manner similar to that employed in the preparation of the reaction product of N,N'-biisomaleimide and aniline, ethyl p-aminophenylacetate was reacted with the N,N'-biisomaleimide to give the product in approximately quantitative yield. Recrystallization from n-propanol gave material with a melting point of 278–280° C. The infrared spectra had characteristic broad bands at 3.0–3.3, 5.8, 6.0–6.3µ. Upon analysis the product had the following composition:
Calculated for $C_{14}H_{15}N_2O_4$: C, 61.08; H, 5.49; N 10.17. Found: C, 60.76; H, 5.42; N, 10.13.
The data was consistent with the structure:

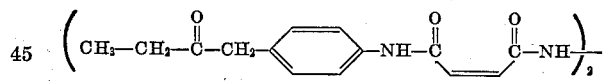

EXAMPLE 13

Reaction product of N,N'-biisomaleimide and phenylhydrazine

In a manner similar to that employed in the preparation of the reaction product of N,N'-biisomaleimide and aniline, phenylhydrazine was reacted with N,N-biisomaleimide to give a nearly quantitative yield of product. After recrystallization from dimethylformamide in water, the material had a melting point of 248–250° C. There were characteristic broad bands in the infrared spectrum at 3.1, 6.0 and 6.2µ. Upon analysis the product had the following composition:

*Analysis.*—Calcd. for $C_{10}H_{10}N_3O_2$: C, 58.81; H, 4.93; N, 20.57. Found: C, 58.75; H, 5.20; N, 20.70.
The data was consistent with the structure:

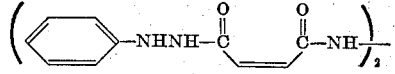

EXAMPLE 14

Reaction product of N,N'-biisomaleimide and benzoyl hydrazine

In a manner similar to that employed in the previous examples, N,N'-biisomaleimide was reacted with benzoyl hydrazine and the reaction product obtained in 70 percent yield. The product was washed thoroughly with hot methanol to provide a product having a melting point of 190° C. Characteristic broad bands were observed in the infrared at 3.2, 6.0, and 6.3μ. Upon analysis the product had the following composition:

Analysis.—Calcd. for $C_{11}H_{10}N_3O_3$: C, 56.89; H, 4.34; N, 18.09. Found: C, 56.27; H, 4.41; N, 17.73.

The data was consistent with the structure:

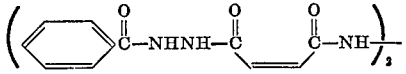

EXAMPLE 15

Reaction product of N,N'-biisomaleimide and isonicotinoyl hydrazine

In a manner similar to that employed in the previous example N,N'-biisomaleimide was reacted with isonicotinoyl hydrazine and the reaction product obtained in 78 percent yield. The product had a melting point of 206° to 208° C. and the following analysis:

Calculated for $C_{10}H_7N_4O_3$: C, 51.49; H, 3.89; N, 24.02. Found: C, 51.25; H, 4.18; N, 23.84.

The data was consistent with the assigned structure:

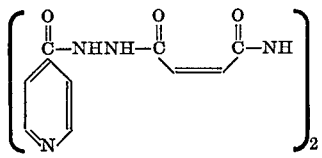

EXAMPLE 16

Reaction product of N,N'-biisomaleimide and n-butanol

N,N'-biisomaleimide (1.0 gram, 0.005 mole) and 0.2 gram 2-hydroxypyridine were refluxed with stirring in n-butanol, for thirty minutes. The homogeneous reaction mixture was concentrated under vacuum leaving a liquid residue. This was dissolved in methylene chloride and extracted with .1 N hydrochloric acid. The methylene chloride layer gave an oily residue which crystallized on standing. Recrystallization from ether gave the product in essentially quantitative yield, having a melting point of 100–101° C.

The product had an infrared spectra with characteristic NH absorption at 3.2μ, ester carbonyl absorption at 5.8 and 8.5μ, and double bond absorption at around 6.3μ. The NMR had vinyl absorption consisting of 2 superimposed AB patterns at around 6.5 p.p.m., OCH₂ absorption at 4.5 p.p.m., and broad alkyl absorption between 1–2 p.p.m., all in the correct area ratio (trifluoroacetic acid solvent, TMS). Upon analysis the product had the following composition:

Calculated for $C_8H_{12}NO_3$: C, 56.45; H, 7.10; N, 8.22. Found: C, 56.35; H, 6.85; N, 8.50.

The data was consistent with the assigned structure:

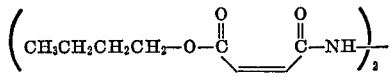

EXAMPLE 17

Reaction product of N,N'-biisomaleimide and cyclohexanol

N,N'-biisomaleimide (1.0 gram, 0.005 mole) and 0.2 gram of 2-hydroxypyridine were heated with stirring at 100–110° in 50 percent excess cyclohexanol until the mixture became homogeneous. The reaction mixture was cooled and the excess cyclohexanol was washed out with hexane. Recrystallization of the residue from acetone gave the product in 70 percent yield having a melting point of 185° C. The infrared had characteristic NH, ester carbonyl, and double-bond absorption as in the n-butanol product and the NMR spectra was consistent with the assigned structure. Upon analysis the product had the following composition:

Analysis.—Calcd. for $C_{10}H_{14}NO_3$: C, 61.20; H, 7.19; N, 7.13. Found: C, 60.97; H, 7.11; N, 7.56.

EXAMPLE 18

Polymerization of N,N'-biisomaleimide with hexamethylene diamine

Hexamethylene diamine (1.16 grams, 0.01 mole) was added to a stirring mixture of 1.92 grams (0.01 mole) of N,N'-biisomaleimide in 10 milliliters of dimethylsulfoxide. After 25 minutes 5 milliliters of dimethylsulfoxide was added to the viscous mixture, to give a homogeneous, but still viscous solution. After 2 hours at room temperature a tough, yellow, and fibrous product was obtained by coagulation. This was washed with 300 milliliters of water and dried in vacuo at 60° C. to provide a yield of 2.89 grams which represented 94 percent of the theoretical value. The reduced viscosity of this material in a .2 percent of m-cresol was 0.11.

EXAMPLE 19

Polymerization of N,N'-biisomaleimide with piperazine

Into a dry 50 milliliter 2-necked flask equipped with a thermometer, magnetic stirrer, drying tube and a nitrogen inlet, there was placed 2.23 grams of N,N'-biisomaleimide, 1.0 gram of piperazine and 25 milliliters of dimethylsulfoxide. The mixture was heated at 55° C. for 2.2 hours. The solution was poured into 300 milliliters of a mixture of ice and water, and the precipitate was removed by filtration and dried. There was obtained 2.97 grams of a lumpy white solid which did not melt below 327° C. The reduced viscosity of the polymer in m-cresol at 25° was 0.12.

EXAMPLE 20

Polymerization of N,N'-biisomaleimide with trans-2,5-dimethylpiperazine

A dry 50 milliliter, 2-necked flask was equipped with a thermometer, magnetic stirrer, drying tube and nitrogen inlet. The flask was charged with 0.59 gram of N,N'-biisomaleimide, 1.0 gram of trans-2,5-dimethylpiperazine and 35 milliliters of dry dimethylsulfoxide. The mixture was heated at 60° C. for 1.2 hour. The solvent was removed under reduced pressure (about 100° C. and 1 millimeter) and the viscous liquid was triturated with an acetone-ether mixture. The yellow precipitate was removed by filtration, washed with ether and dried. There was obtained 0.9 gram of solid, which was soluble in water and had a melting point of 173–174° C. Its reduced viscosity in H₂O was 0.11.

EXAMPLE 21

Polymerization of N,N'-biisomaleimide with cis-2,5-dimethylpiperazine

Into a flask, equipped as described in the previous example, was placed 1.78 grams of N,N'-biisomaleimide and 25 milliliters of dry dimethylsulfoxide. To the mixture was added slowly 3.0 grams of cis-2,5-dimethylpiperazine in 10 milliliters of dimethylsulfoxide. The reaction became exothermic and was allowed to proceed for 18 hours. The solvent was removed at 70° C. and 1.0 milliliter pressure. The amber residual oil was boiled with acetone, giving 3.80 grams of a yellow solid. The material had a melting point of 108–110° C. and was soluble in water. Its reduced viscosity was 0.09 in H₂O.

EXAMPLE 22

Polymerization of N,N'-biisomaleimide with hexamethylenediamine

A 50 milliliter 3-necked flask was equipped with a magnetic stirrer, thermometer, drying tube and a nitrogen inlet. Into the flask was placed 4.54 grams of N,N'-biisomaleimide and 25 milliliters of dry dimethylsulfoxide. To the mixture was added slowly with ice bath cooling, a solution of 2.77 grams of hexamethylenediamine in 5 milliliters of dimethylsulfoxide. The temperature of the reaction was kept at 20° C. The reaction mixture was allowed to warm slowly to room temperature and to stir for 8 days. The solution was filtered through a sintered glass funnel and a portion of the solution was used to cast a film. The remainder (82 percent) of the solution was coagulated in a mixture of ice and water, giving 4.5 grams of a yellow polymer. Reduced viscosity of the polymer was 0.31 in m-cresol at 25° C.

EXAMPLE 23

Polymerization of N,N'-biisomaleimide and hexamethylenediamine

Into a dry 2-necked flask, equipped with a magnetic stirrer, thermometer and drying tube there was placed 2.52 grams of N,N'-biisophthalimide and 10 milliliters of dry dimethylsulfoxide. To the slurry was added 1.03 grams of purified hexamethylenediamine in 2 milliliters of dimethylsulfoxide. An exothermic reaction ensued and the reaction mixture became homogeneous. The reaction mixture was stirred for 3 hours, coagulated by pouring into 100 milliliters of a mixture of Dry Ice and isopropanol and the polymer was collected by filtration. The solid was washed and died in a vacuum oven. There was obtained 2.32 grams of polymer having a melting point of 109° C. soluble in N,N'-dimethylformamide. Reduced viscosity in dimethylformamide at 25° C. was 0.08.

EXAMPLE 24

Polymerization of N,N'-biisomaleimide and hexamethylenediamine in the melt

A dry test tube with a side arm was equipped with a capillary connected to a supply of argon. Into the test tube was placed 1.21 grams of hexamethylenediamine and 2.00 grams of N,N'-biisomaleimide. The reaction was somewhat exothermic at first and then subsided. The test tube was heated to 160° C. over a period of 2.8 hours. The solid product (3.6 grams) was clearly non-homogeneous. The yellow solid did not melt below 325° C. The reduced viscosity of the soluble portion of the polymer was 0.11 in m-cresol at 25° C.

EXAMPLE 25

Polymerization of bis(5-norbornene-2,3-isodicarboximide) with hexamethylene diamine A dry 100 milliliter 3-neck flask was equipped with a magnetic stirrer, thermometer and drying tube. Into the flask was placed 2.79 grams of bis(5-norbornene-2,3-isodicarboximide) in 10 milliliters of dry dimethylsulfoxide. To the mixture was added a solution of 1 gram of purified hexamethylenediamine in 10 milliliters of dimethylsulfoxide. The reaction became exothermic and the solution became homogeneous. The reaction was allowed to proceed for 24 hours at room temperature, and then the product was coagulated with 200 milliliters of ice-cold isopropanol. The solid material was washed with isopropanol and dried in a vacuum oven. There was obtained 1.3 grams of a solid, soluble in chloroform. The reduced viscosity of the material was 0.40 in CHCl$_3$ at 25° C.

EXAMPLE 26

Polymerization of bis-(5-norbornene-2,3-isodicarboximide) with hexamethylenediamine in the melt A test tube with a side arm was fitted out with a capillary tube reaching the bottom. Into the test tube was charged 2.79 grams of bis(5-norbornene-2,3-isodicarboximide and 1.00 grams of purified hexamethylenediamine. Nitrogen was bubbled through the mixture to remove any air and the mixture was heated gradually to 150° C. over a period of 4.5 hours. The mixture melted, became viscous, and took on an orange color. On cooling, the mixture remained as an oil and resisted attempts to crystallize. There was obtained 3.41 grams of an orange oil with a reduced viscosity of 0.08 in CHCl$_3$ at 25° C.

EXAMPLE 27

Polymerization of N,N'-biisomaleimide with hydrazine

A dry 5 milliliter 2-necked flask was equipped with a thermometer, drying tube, magnetic stirrer and a nitrogen inlet. Into the flask was placed 2.0 grams of N,N'-biisomaleimide and 20 milliliters of dry dimethylsulfoxide. To the mixture was added slowly 0.354 gram of hydrazine in 2 milliliters of dimethylsulfoxide. An exothermic reaction occurred and the reaction was allowed to proceed for 18 hours. The product which had precipitated was removed by filtration and washed with water. There was obtained 2.82 grams of a yellow solid, melting at 175° C. and insoluble in all the solvents which were tried.

EXAMPLE 28

Polymer from N,N'-biisomaleimide and hexamethylenediamine treated with cyclopentadiene A dry 500 milliliter flask was equipped with a condenser, a drying tube and a magnetic stirrer. Into the flask was placed a mixture of 2.5 grams of the polymer, 17.62 grams of cyclopentadiene and 120 milliliters of dry benzene. The mixture was refluxed for 24 hours. The cold mixture was filtered and the solid was dried. There was obtained 1.93 grams of a brittle yellow solid with reduced viscosity in m-cresol at 25° C. of 0.09.

Although the invention has been illustrated by the preceding examples, it is not to be construed as limited to the materials employed therein, but rather, the invention encompasses the generic area as hereinbefore disclosed. Various modifications and embodiments of this invention can be made without departing from the spirit and scope thereof.

What is claimed is:

1. A thermoplastic polymeric product having a molecular weight of up to 30,000 and consisting essentially of the recurring units:

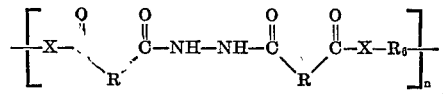

wherein R represents a divalent hydrocarbon group of from 2 to 24 carbon atoms wherein two adjacent carbon atoms of said R groups are attached to the carbonyl groups; R$_6$ represents a hydrocarbon group of from 1 to 24 carbon atoms; X represents —NH—; and n has a value of at least 2.

2. A thermoplastic polymeric product having a molecular weight of up to 30,000 and consisting essentially of the recurring unit:

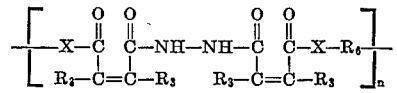

wherein R$_3$ represents a member selected from the class consisting of hydrogen, and hydrocarbon groups having a total of up to 22 carbon atoms; R$_6$ represents a hydrocarbon group of from 1 to 24 carbon atoms; X represents —NH—; and n has a value of at least 2.

3. A thermoplastic polymeric product having a molecular weight of up to 30,000 and consisting essentially of the recurring unit:

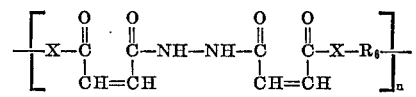

wherein R$_6$ represents a hydrocarbon group of from 1 to 24 carbon atoms; X represents —NH—; and n has a value of at least 2.

4. A thermoplastic polymeric product having a molecular weight of up to 30,000 and consisting essentially of the recurring unit:

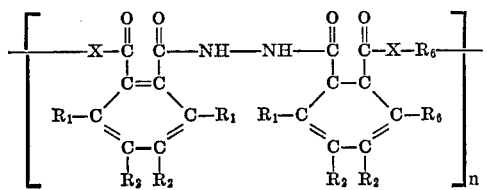

wherein $R_1$ and $R_2$ represent a member selected from the class consisting of hydrogen and hydrocarbon groups, said $R_1$'s and $R_2$'s on the same ring having a total of up to 18 carbon atoms; $R_6$ represents a hydrocarbon group of from 1 to 24 carbon atoms; X represents —NH—; and $n$ has a value of at least 2.

References Cited

UNITED STATES PATENTS

| | | | |
|---|---|---|---|
| 2,349,979 | 5/1944 | Moldenhauer et al. | 260—78 |
| 2,512,631 | 6/1950 | Fisher et al. | 260—78 |
| 2,615,862 | 10/1952 | McFarlane et al. | 260—78 |
| 3,130,182 | 4/1964 | Frazer | 260—78 |
| 3,238,183 | 3/1966 | Frazer | 260—78 |

FOREIGN PATENTS 849,154  9/1960  Great Britain.

HAROLD D. ANDERSON, Primary Examiner

U.S. Cl. X.R.

117—161; 260—29.2, 30.8, 32.6, 33.4, 33.8, 47, 75, 79, 88.3, 343.2, 343.3, 343.5, 343.6, 558, 561